(12) United States Patent
Lee

(10) Patent No.: US 10,240,312 B2
(45) Date of Patent: Mar. 26, 2019

(54) AQUATIC CONTAMINATOR ELIMINATION DEVICE

(71) Applicant: Jeong Yong Lee, Gyeonggi-do (KR)

(72) Inventor: Jeong Yong Lee, Gyeonggi-do (KR)

( * ) Notice: Subject to any disclaimer, the term of this patent is extended or adjusted under 35 U.S.C. 154(b) by 321 days.

(21) Appl. No.: 15/030,603

(22) PCT Filed: Oct. 19, 2014

(86) PCT No.: PCT/KR2014/009815
§ 371 (c)(1),
(2) Date: Apr. 20, 2016

(87) PCT Pub. No.: WO2015/057029
PCT Pub. Date: Apr. 23, 2015

(65) Prior Publication Data
US 2016/0265179 A1 Sep. 15, 2016

(30) Foreign Application Priority Data

Oct. 20, 2013 (KR) .................. 10-2013-0125001
Jan. 13, 2014 (KR) .................. 10-2014-0003691
(Continued)

(51) Int. Cl.
*E02B 15/10* (2006.01)
*E02B 15/04* (2006.01)
(Continued)

(52) U.S. Cl.
CPC .............. *E02B 15/10* (2013.01); *B01D 15/02* (2013.01); *B63B 35/32* (2013.01); *B63B 45/02* (2013.01);
(Continued)

(58) Field of Classification Search
None
See application file for complete search history.

(56) References Cited

U.S. PATENT DOCUMENTS 3,643,804 A * 2/1972 Sharpton .............. E02B 15/104
210/242.4
3,763,049 A * 10/1973 Gerber .................. B01D 15/02
252/625
(Continued)

FOREIGN PATENT DOCUMENTS

KR 10-1994-0004152 A 3/1994
KR 20-0132082 Y1 3/1999
(Continued)

OTHER PUBLICATIONS

International Search Report for PCT/KR2014/009815 dated Feb. 16, 2015 from Korean Intellectual Property Office.

*Primary Examiner* — Richard C Gurtowski
(74) *Attorney, Agent, or Firm* — Revolution IP, PLLC

(57) ABSTRACT

An apparatus for removing water contaminants, in which when water contaminants, such as oil, green algae and red algae, are generated on the water surface, the apparatus sucks in the water contaminants, passes the sucked in water contaminants through an absorbent paper in order that the water contaminants are absorbed by the absorbent paper, and makes the absorbent paper roll periodically or continuously, thereby maintaining the absorbability of the absorbent paper contaminated by the water contaminants. The apparatus includes a suction pipe for sucking in the water contaminants from an inlet; a suction pump connected to the suction pipe for sucking in the water contaminants from the inlet to the outlet side of the suction pipe; and an absorbent paper installed at the periphery of the inlet of the suction pipe, wherein the absorbent paper is installed to be movable in the inlet and absorb the water contaminants.

11 Claims, 4 Drawing Sheets

(30) Foreign Application Priority Data

| | | |
|---|---|---|
| Feb. 2, 2014 | (KR) | 10-2014-0011879 |
| Feb. 6, 2014 | (KR) | 10-2014-0013889 |
| Feb. 19, 2014 | (KR) | 10-2014-0019296 |
| Jul. 15, 2014 | (KR) | 10-2014-0089000 |
| Aug. 10, 2014 | (KR) | 10-2014-0102743 |
| Oct. 14, 2014 | (KR) | 10-2014-0138649 |

(51) Int. Cl.

| | |
|---|---|
| *B01D 15/02* | (2006.01) |
| *B63B 35/32* | (2006.01) |
| *B63B 45/02* | (2006.01) |
| *C02F 1/28* | (2006.01) |
| *C02F 101/32* | (2006.01) |
| *C02F 103/00* | (2006.01) |

(52) U.S. Cl.
CPC .............. *C02F 1/28* (2013.01); *E02B 15/045* (2013.01); *E02B 15/106* (2013.01); *C02F 2101/32* (2013.01); *C02F 2103/007* (2013.01); *C02F 2201/008* (2013.01); *Y02A 20/204* (2018.01)

(56) References Cited

U.S. PATENT DOCUMENTS

| | | | | |
|---|---|---|---|---|
| 4,145,290 | A | * 3/1979 | Nagy | B63B 35/32 |
| | | | | 210/242.3 |
| 5,532,679 | A | * 7/1996 | Baxter, Jr. | E02B 15/04 |
| | | | | 340/539.26 |
| 2005/0035070 | A1 | * 2/2005 | Egli | E02B 15/104 |
| | | | | 210/776 |

FOREIGN PATENT DOCUMENTS

| | | |
|---|---|---|
| KR | 10-2000-0066838 A | 11/2000 |
| KR | 10-0851669 B1 | 8/2008 |
| KR | 20-0452158 Y1 | 2/2011 |
| KR | 10-1221579 B1 | 1/2013 |

* cited by examiner

[FIG. 1]
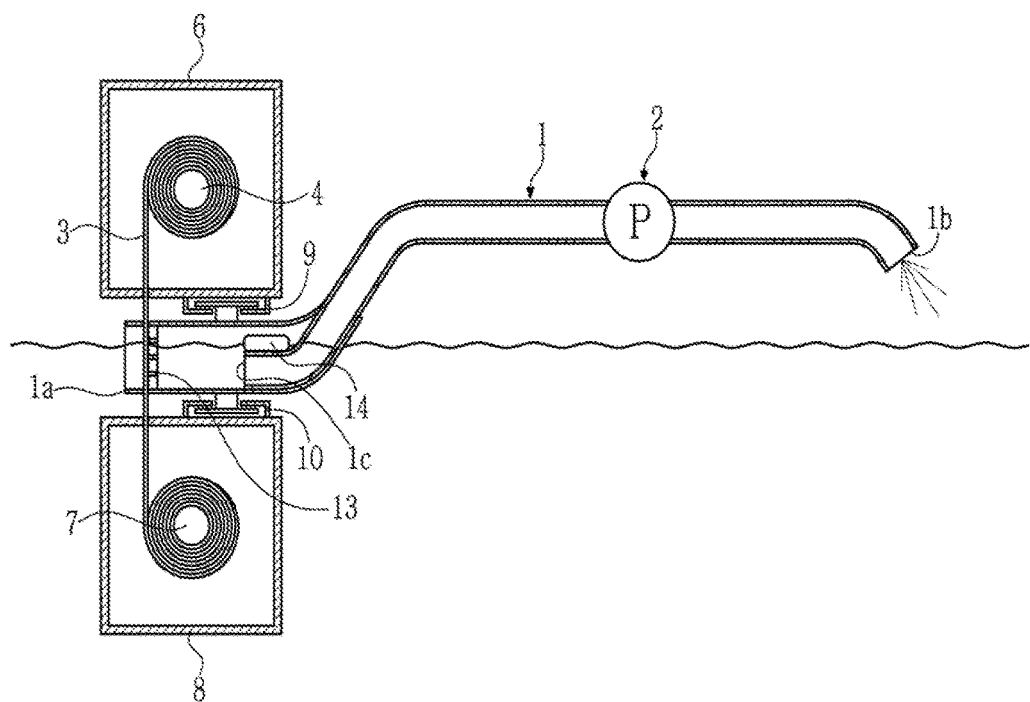

[FIG. 2]
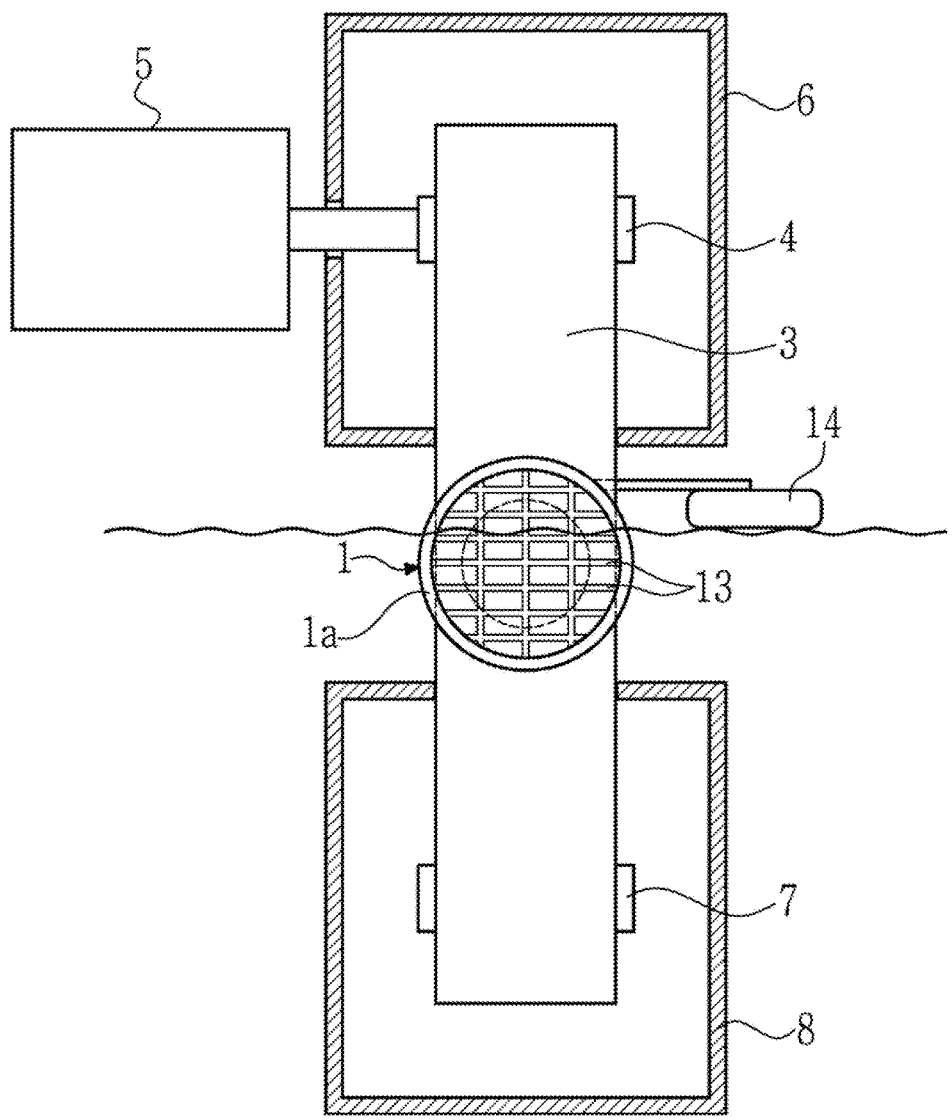

[FIG. 3]
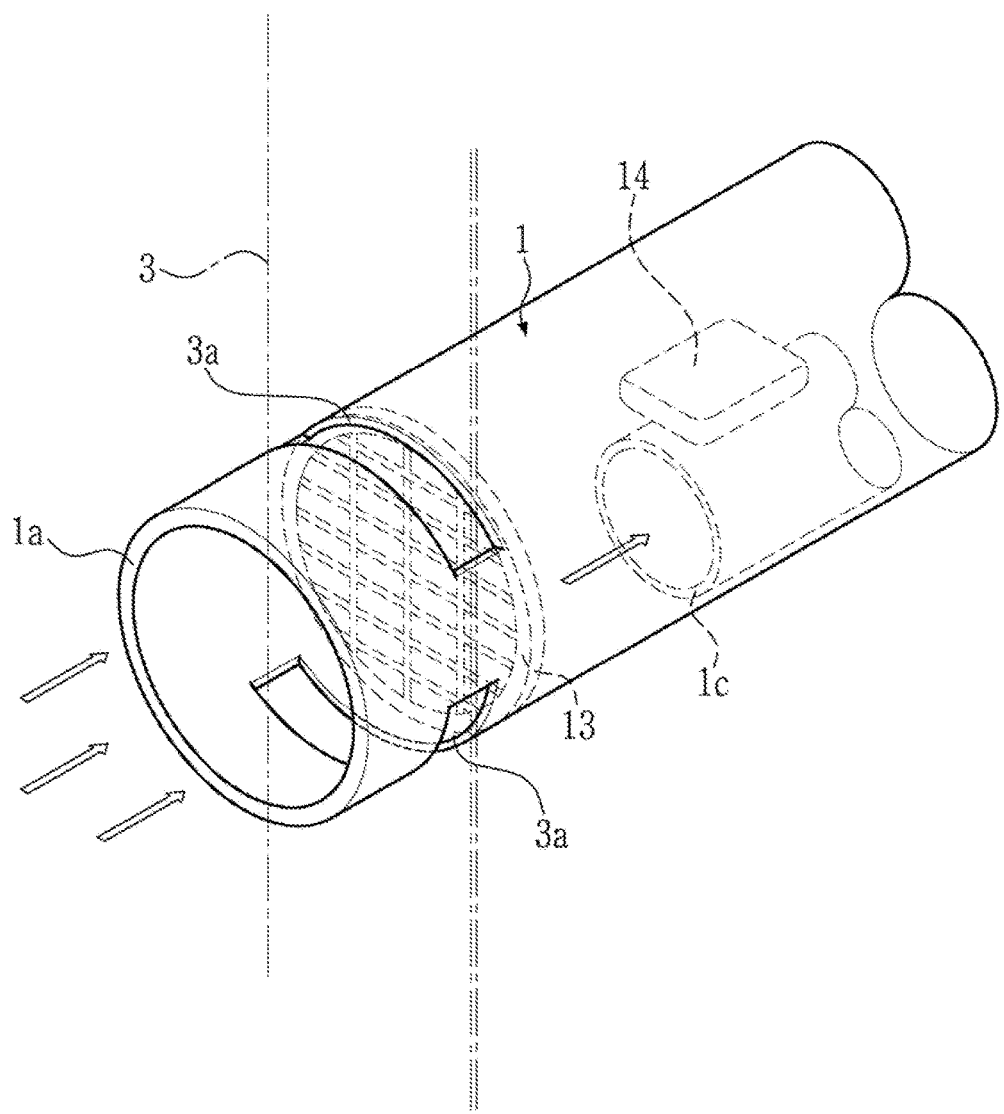

[FIG. 4]
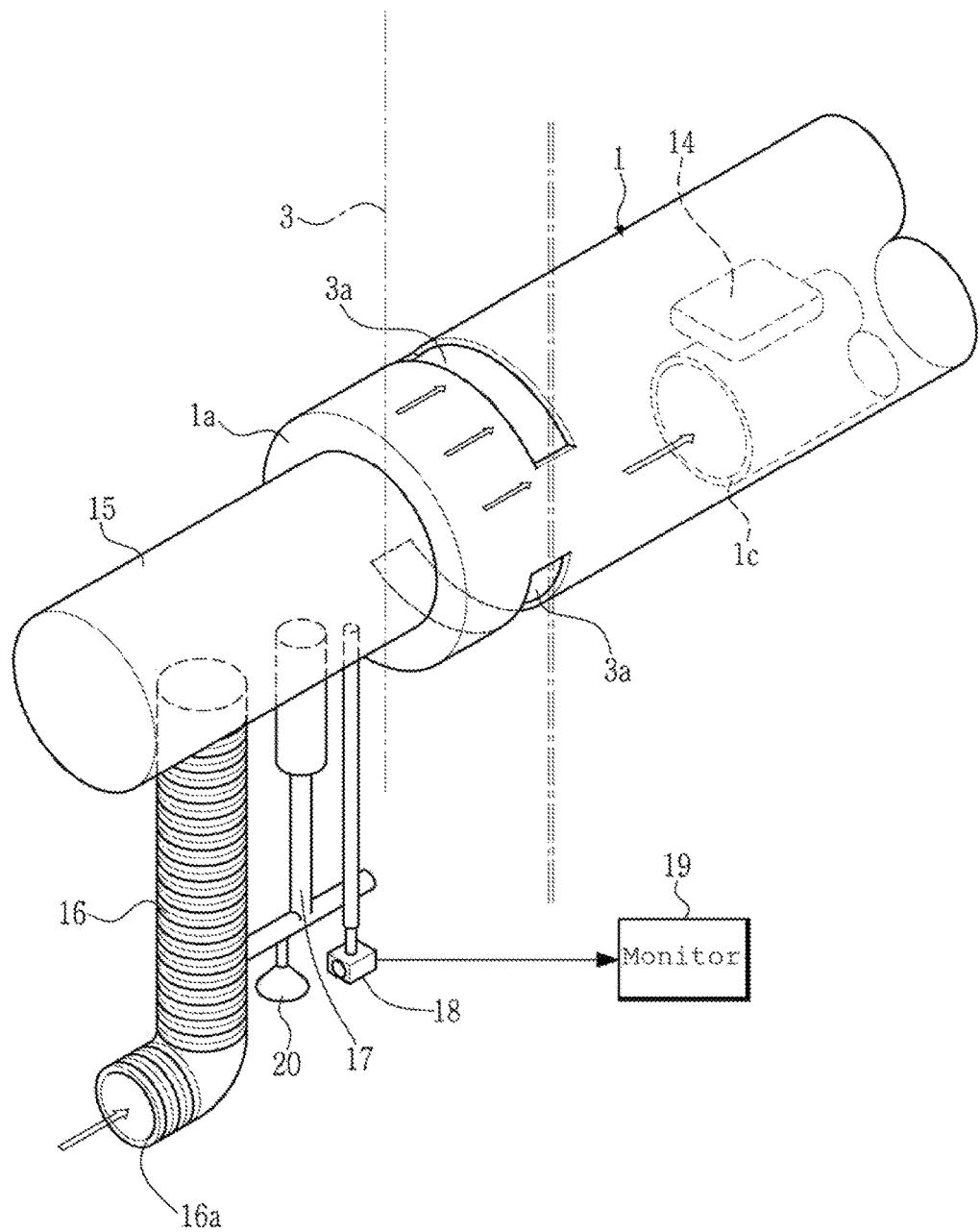

AQUATIC CONTAMINATOR ELIMINATION DEVICE

CROSS REFERENCE TO PRIOR APPLICATIONS

This application is a National Stage Application of PCT International Patent Application No. PCT/KR2014/009815 filed on Oct. 19, 2014, under 35 U.S.C. § 371, which claims priority to Korean Patent Application Nos. 10-2013-0125001 filed on Oct. 20, 2013, 10-2014-0003691 filed Jan. 13, 2014, 10-2014-0011879 filed Feb. 2, 2014, 10-2014-0013889 filed Feb. 6, 2014, 10-2014-0019296 filed Feb. 19, 2014, 10-2014-0089000 filed Jul. 15, 2014, 10-2014-0102743 filed Aug. 10, 2014, and 10-2014-0138649 filed Oct. 14, 2014, which are all hereby incorporated by reference in their entirety.

TECHNICAL FIELD

The present invention generally relates to an apparatus for removing water contaminants. More particularly, the present invention relates to an apparatus for removing water contaminants, the apparatus being able to take in water contaminants and catch water contaminants using absorption cloth by causing water contaminants to pass through the absorption cloth when water contaminants, such as oil, green algae, or red algae, are formed on the surface of water, and being able to periodically or continuously roll the absorption cloth, thereby continuously maintaining the absorption performance of the absorption cloth contaminated by water contaminants.

BACKGROUND ART

Recently, oil spill accidents, in which oil spills into seawater, frequently occur due to the collision of oil tankers or the like.

In this case, as is known in the related art, oil-removing treatments include a method of disposing a floating fence (an oil boom) surrounding water contaminants to prevent water contaminants from spreading, submerging absorption cloth in locations in which oil is present, such that the absorption cloth absorbs oil, and then removing oil remains permeated into the absorption cloth, and a method of decomposing water contaminants by spraying an oil treatment agent onto water contaminants.

Here, the method of spraying an oil treatment agent is not used unless an emergency situation has occurred, since this method has a side effect of destroying the marine ecosystem.

As is also known in the art, oil washed up on the coastline is removed by allowing oil remains to adhere to sand or pebbles and then sterilizing sand or pebbles to which oil remains have adhered through heating. However, this method of heating sand and pebbles to which oil remains have adhered also removes marine micro-organisms, which is problematic.

Thus, the most reliable and least problematic method among the existing oil removing methods is to remove oil remains using absorption cloth.

However, the method of removing oil remains using absorption cloth is known as having the problem of low efficiency, since work of removing oil remains from absorption cloth is very difficult and takes a significant amount of time.

In this regard, Korean Patent No. 10-1221579 discloses an apparatus equipped in a vessel for removing green and red algae. The apparatus includes a water introducing part, a water pump, an inline mixer, a chemical introducing part, an electrical cell, a floating and separating bath, a disk filter, an outlet, and a control unit. The water introducing part introduces contaminated water in order to remove floating matter using a filter. The water pump pumps contaminated water through the water introducing part. The inline mixer stirs contaminated water supplied through the water pump. The chemical introducing part introduces chemicals into contaminated water in order to purify contaminated water in the inline mixer. The electrical cell electrically coagulates contaminants in contaminated water and oxidizes and reduces contaminated water. The floating and separating bath allows contaminated water treated in the electrical cell to remain for a predetermined period of time in order to purify contaminated water through chemical reactions, and removes fine particles from contaminated water by floating fine particles upwards, thereby producing a supernatant through floating and separation processing. The disk filter filters fine particulates from the supernatant purified through the floating and separating bath. The supernatant, from which fine particulates are removed through the disk filter, is discharged to the sea through the outlet. The control unit controls contaminated water treatment processing using a programmable logic controller (PLC) program. In this manner, the apparatus for removing green and red algae can remove green algae, red algae, or causative substances of green and red algae from seawater or a source of water supply.

However, this approach of the related art still has the above-described problem in that the ecosystem is destroyed by the oil treatment agent, since contaminants in water are removed by the filter while contaminated water is introduced by the pump, and contaminated water is purified by a chemical agent.

Therefore, there is required an emergency solution able to very easily remove water contaminants without destroying the marine ecosystem in operations of removing water contaminants, such as not only oil but also red algae and green algae.

DISCLOSURE

Technical Problem

Accordingly, the present invention has been made keeping in mind the above problems occurring in the related art, and the present invention is intended to propose a water contaminant removing apparatus able to very easily remove water contaminants without destroying the marine ecosystem in operations of removing water contaminants.

Technical Solution

In order to achieve the above object, according to one aspect of the present invention, a water contaminant removing apparatus for removing water contaminants, such as oil, red algae, or green algae. The apparatus may include: an intake pipe through which water contaminants are taken in from a second inlet; an intake pump to which the intake pipe is connected, wherein the intake pump takes in water such that the water contaminants taken in towards an outlet of the intake pipe; and the absorption cloth disposed adjacent to the second inlet of the intake pipe. The absorption cloth is movably disposed in the second inlet to absorb the water contaminants.

In this case, the water contaminant removing apparatus may further include: a first roller disposed above the intake pipe or in a portion of a body of a ship above the surface of water when the intake pipe is not provided, one edge of the absorption cloth being wound on an outer circumference of the first roller; a first motor connected to the first roller, the first motor having a handle, with which the first roller is manually rotated, a reduction gear, or a speed-reducing belt; an upper housing surrounding the first roller on which the absorption cloth is wound, having a first opening through which absorption cloth is movable downwards, and fixing the first motor; a second roller disposed below the intake pipe, the other edge of the absorption cloth being wound on an outer circumference of the second roller; and a lower housing surrounding the second roller on which the absorption cloth is wound, and having a second opening through which the absorption cloth is movable upwards.

The water contaminant removing apparatus may further include: a first coupling member coupling the upper housing with the intake pipe; and a second coupling member coupling the lower housing with the intake pipe.

In addition, the second inlet may have fixing holes in upper and lower portions thereof, wherein the absorption cloth is movably fixed to the fixing holes such that the absorption cloth is not deflected in a transverse direction when water is introduced by the pump or the like.

The fixing holes may be formed in upper and lower portions of the second inlet on the upward-downward movement route such that the absorption cloth is movable. When water is introduced through the lower fixing hole in the intake pipe, the amount of force for taking water through the second inlet in front of the intake pipe decreases.

Since the amount of force for taking in contaminated water from the surface of water decreases, clean water is introduced through the lower fixing hole of the intake pipe. Water stoppers formed of an elastic material may be disposed in front of and behind the lower fixing hole of the second inlet to be attached in a compressive manner, thereby preventing water from entering or structures, such as a wall, are formed on edges of the lower fixing hole of the second inlet, thereby preventing water from entering.

The water contaminant removing apparatus may further include a lattice-shaped support film disposed in the inlet of the intake pipe.

In addition, the water contaminant removing apparatus may further include a buoyancy unit coupled to the surrounding portion of the intake pipe. The buoyancy unit may adjust the buoyancy of the intake pipe such that the lower space of the inlet is situated below the surface of water and the upper space of the inlet is situated above the surface of water.

Furthermore, the water contaminant removing apparatus may be coupled with a ship or a submarine.

In this case, the pump is configured such that the first inlet of the intake pipe is submerged in water and the second inlet of the intake pipe is disposed between water containing oil, red algae, or green algae and the first inlet to surround the first inlet in a watertight manner. The diameter of the second inlet is greater than the diameter of the first inlet. The second inlet extends from above to below the surface of water.

The water contaminant removing apparatus may further include: a length adjustable pipe disposed on the second inlet; and a length-adjusting unit coupled to a side portion of the length adjustable pipe to adjust the length of the length adjustable pipe.

The water contaminant removing apparatus may further include: an underwater camera disposed adjacent to an inlet of the length adjustable pipe that adjusts the length of the intake pipe; and a monitor working in concert with the underwater camera to display images captured by the underwater camera by receiving images therefrom.

The water contaminant removing apparatus may further include a lighting unit disposed adjacent to the underwater camera to radiate light in a direction in which the underwater camera captures images.

Advantageous Effects

As set forth above, the present invention can remove contaminants using absorption cloth by periodically or continuously arranging a clean portion of the absorption cloth in the inlet, thereby removing contaminants more efficiently than manual operations of the related art without influencing on the marine ecosystem.

DESCRIPTION OF DRAWINGS

FIG. 1 is a front cross-sectional view illustrating a water contaminant removing apparatus according to an embodiment of the present invention;

FIG. 2 is a left side elevation view of the water contaminant removing apparatus illustrated in FIG. 1;

FIG. 3 is a partially enlarged perspective view illustrating the surroundings of an inlet of the water contaminant removing apparatus illustrated in FIG. 1; and FIG. 4 is a view illustrating a configuration in which an extension pipe is added to the inlet of the intake pipe and a length adjustable pipe is disposed on the extension pipe.

| 1: intake pipe | 2: intake pump |
|---|---|
| 3: absorption cloth | 4: first roller |
| 5: first motor | 6: upper housing |
| 7: second roller | 8: lower housing |
| 9: first coupling member | 10: second coupling member |
| 13: lattice-shaped supporting film | |
| 14: buoyancy unit | 15: extension pipe |
| 16: length adjustable pipe | |
| 17: length-adjusting unit | 18: underwater camera |
| 19: monitor | 20: lighting unit |

BEST MODE

Provided is a water contaminant removing apparatus for removing water contaminants, such as oil, red algae, or green algae.

The apparatus includes an intake pipe having an absorption cloth housing in which a scroll of absorption cloth is disposed to be movable along an upward-downward movement route. When fixing holes are formed on the movement route, the scroll of absorption cloth moves through the fixing holes, and when no fixing holes are formed on the upward-downward movement route, the scroll of absorption cloth is able to be wound around a central axis of the absorption cloth housing. The absorption cloth housing is positioned in an upper and lower part of water or above or below a surface of water containing oil, red algae, or green algae. Water contaminants are taken in through the intake pipe from a second inlet.

The water contaminant removing apparatus further includes an intake pump to which the intake pipe is connected. The intake pump takes in water such that the water contaminants taken in towards an outlet of the intake pipe; and The water contaminant removing apparatus further includes the absorption cloth disposed adjacent to the second inlet of the intake pipe.

The absorption cloth may be movably disposed in the second inlet to absorb the water contaminants. The pump may be configured such that the first inlet of the intake pipe is submerged in water and the second inlet of the intake pipe is disposed in front of the first inlet to surround the first inlet in a watertight manner, the diameter of the second inlet being greater than the diameter of the first inlet, and the second inlet extending from above to below the surface of water. A buoyancy unit may be disposed inside or outside of the intake pipe, the buoyancy unit allowing the second inlet to extend from above to below the surface of water and the first inlet to be submerged in water. The second inlet may have fixing holes in upper and lower portions thereof. The absorption cloth is movably fixed to the fixing holes such that the absorption cloth is not deflected in a transverse direction when water is introduced by the pump or the like.

The water contaminant removing apparatus may further include a support film, such as a lattice-shaped support film, disposed in the inlet of the intake pipe. When water is introduced by the pump or the like, the support film prevents the absorption cloth from being pushed backwards to prevent water from being taken in through the inlet. A first roller may be further provided above the intake pipe or in a portion of a body of a ship above the surface of water when the intake pipe is not provided, one edge of the absorption cloth being wound on an outer circumference of the first roller.

A first motor may be connected to the first roller, the first motor having a handle, with which the first roller is manually rotated, a reduction gear, or a speed-reducing belt.

An upper housing may be configured to surround the first roller on which the absorption cloth is wound. The upper housing has a first opening through which absorption cloth is movable downwards.

The upper housing may fix the first motor.

A second roller may be disposed below the intake pipe.

The other edge of the absorption cloth is wound on an outer circumference of the second roller.

A lower housing may be configured to surround the second roller on which the absorption cloth is wound. The lower housing has a second opening through which the absorption cloth is movable upwards. A first coupling member may be configured to couple the upper housing with the intake pipe.

A second coupling member may be configured to couple the lower housing with the intake pipe.

When the intake pipe is not provided, the upper housing and the lower housing are coupled using coupling members or are formed integrally to bring more portions of the absorption cloth into contact with the surface of water.

The fixing holes may be formed in upper and lower portions of the second inlet on the upward-downward movement route such that the absorption cloth is movable. Water stoppers formed of an elastic material may be disposed in front of and behind the lower fixing hole of the second inlet to be attached in a compressive manner, thereby preventing water from entering or structures, such as a wall, are formed on edges of the lower fixing hole of the second inlet, thereby preventing water from entering, since, when water is introduced through the lower fixing hole in the intake pipe, an amount of force for taking in water through the second inlet in front of the intake pipe decreases, such that clean water is introduced through the lower fixing hole of the intake pipe. A length adjustable pipe is disposed on the second inlet or coupled using a coupling member to adjust a length of the intake pipe.

Also provided is a length-adjusting unit coupled to a side portion of the length adjustable pipe to adjust the length of the length adjustable pipe. The water contaminant removing apparatus as described above may be coupled with one selected from the group consisting of a ship, a submarine, a robot ship, a remote control (RC) ship, a robot submarine, and an RC submarine. Also provided is an underwater camera disposed adjacent to an inlet of the length adjustable pipe that adjusts the length of the intake pipe.

Also provided is a monitor working in concert with the underwater camera to display images captured by the underwater camera by receiving images therefrom. The water contaminant removing apparatus further includes a lighting unit disposed adjacent to the underwater camera to radiate light in a direction in which the underwater camera captures images.

MODE FOR INVENTION

The above and other objects and features of the present invention will be more clearly understood from the following description of embodiments in conjunction with the accompanying drawings.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, a water contaminant removing apparatus according to an embodiment of the present invention will be described in detail with reference to FIG. 1 to FIG. 4.

FIG. 1 is a front cross-sectional view illustrating a water contaminant removing apparatus according to the embodiment of the present invention. FIG. 2 is a left side elevation view of the water contaminant removing apparatus illustrated in FIG. 1. FIG. 3 is a partially enlarged perspective view illustrating the surroundings of an inlet of the water contaminant removing apparatus illustrated in FIG. 1.

As illustrated in FIG. 1 to FIG. 3, the water contaminant removing apparatus according to the embodiment of the present invention includes an intake pipe 1, an intake pump 2, and absorption cloth 3.

The intake pipe 1 has a first inlet 1c submerged under the surface of water and a second inlet 1a disposed in front of the first inlet 1c of the pump. The diameter of the second inlet 1a is greater than that of the first inlet 1c such that the second inlet 1a surrounds the first inlet 1c in a watertight manner. The second inlet 1a is disposed such that the second inlet 1a extends from above to below the surface of water containing oil, red algae, or green algae. In the case of taking in water, the interior of the pipe is sufficiently filled with water.

The intake pump 2 is connected to the intake pipe 1. The intake pump 2 may be connected and coupled to a region of the body of the intake pipe 1 disposed above the surface of water. The intake pump 2 allows water contaminants to be taken through the inlet 1a in the direction of an outlet 1b of the intake pipe 1.

The absorption cloth 3 is disposed adjacent to the inlet 1a of the intake pipe 1 to be movable with respect to the inlet 1a in order to absorb water contaminants, such as oil, red algae, or green algae, introduced through the inlet 1a.

In the water contaminant removing apparatus according to the embodiment of the present invention including the intake pipe 1, the intake pump 2, and the absorption cloth 3 as described above, the intake pump 2 is driven to take in water containing water contaminants through the second inlet 1a of the intake pipe 1 disposed on the surface of water. In this case, the absorption cloth 3 is periodically or continuously moved in the bottom-to-top direction, such that a clean portion of the absorption cloth 3 can be periodically or continuously arranged adjacent to the second inlet 1a to remove water contaminants.

Thus, the water contaminant removing apparatus according to the embodiment of the present invention can remove contaminants by periodically or continuously arranging a clean portion of the absorption cloth 3 adjacent to the first inlet 1a without having an effect on the aquatic ecosystem, thereby removing water contaminants in a more efficient manner compared to the related-art method of manually removing water contaminants.

In addition, the water contaminant removing apparatus according to the embodiment of the present invention further includes a first roller 4, a first electric motor 5, an upper housing 6, a second roller 7, and a lower housing 8.

The first roller 4 is disposed above the intake pipe 1. In this case, one edge of the absorption cloth 3 is wound on the outer circumference of the first roller 4.

The first electric motor 5 is connected to the first roller 4 to rotate the first roller 4.

The upper housing 6 surrounds the first roller 4 on which the absorption cloth 3 is wound, has a first opening through which the absorption cloth 3 can move downwards, and surrounds the first electric motor 5. In this case, the upper housing 6 defines a space in which the first electric motor 5 can be fixed, such that the first electric motor 5 and the first roller 4 can be fixed in a specific position. The upper housing 6 surrounds the contaminated absorption cloth 3 wound on the first roller 4 and the first electric motor 5, thereby preventing debris of the absorption cloth 3 from being discharged externally or the electric motor from being short-circuited by water.

The second roller 7 is disposed below the intake pipe 1, and the other edge of the absorption cloth 3 is wound on the outer circumference of the second roller 7.

The lower housing 8 surrounds the second roller 7 on which the absorption cloth 3 is wound, and has a second opening through which the absorption cloth 3 can move upwards. In this case, the lower housing 8 has defined a space in which the second roller 7 can be rotatably fixed.

In addition, fixing holes 3a are formed in the upper and lower portions of the second inlet 1a of the intake pipe 1. The fixing holes 3a serve to fix the absorption cloth 3 such that the absorption cloth 3 does not lean in the transverse direction when water is introduced using the pump or the like.

Furthermore, in the position in which the fixing holes 3a are formed in the upper and lower portions of the second inlet 1a, corresponding to the upward and downward passage of the absorption cloth 3, such that the absorption cloth 3 is movable upwards and downwards, when water is introduced through the lower fixing hole 3a in the intake pipe 1, the amount of force for taking in water through the second inlet 1a in front of the intake pipe 1 decreases. Then, the amount of force for taking in contaminated water from the surface of water decreases, and clean water is introduced through the lower fixing hole 3a of the intake pipe 1. Water stoppers formed of an elastic material are disposed in front of and behind the lower fixing hole of the second inlet 1a and are attached in a compressive manner, thereby preventing water from entering. Alternatively, structures, such as a wall, are formed on the edges of the lower fixing hole of the second inlet 1a, thereby preventing water from entering.

In the first roller 4 and the second roller 7 with the absorption cloth 3 wound thereon as described above, when the electric motor periodically or continuously rotates, the first roller 4 and the second roller 7 roll the absorption cloth 3 such that the absorption cloth 3 periodically or continuously moves in the second inlet 1a. This causes the surfaces of clean portions of the absorption cloth 3 to absorb water contaminants, thereby improving absorption efficiency.

Here, the water contaminant removing apparatus according to the embodiment of the present invention may further include a first coupling member 9 and a second coupling member 10.

The first coupling member 9 is a coupling means, such as a fastening member or a weld, for coupling the upper housing 6 with the intake pipe 1.

The second coupling member 10 is a coupling means, such as a fastening member or a weld, for coupling the lower housing 8 with the intake pipe 1.

The first coupling member 9 and the second coupling member 10 couple the upper housing 6 and the lower housing 8 to the intake pipe 1, such that the intake pipe 1 is formed integrally with the first roller 4, upper housing 6, the second roller 7, the lower housing 8, and the intake pump 2. Accordingly, the water contaminant removing apparatus according to the embodiment of the present invention can be used while moving on the surface of water.

Here, as an example of using the water contaminant removing apparatus according to the embodiment of the present invention while moving on the surface of water, the water contaminant removing apparatus is coupled to a water transport apparatus, such as a ship, a submarine, a robot ship, an RC ship, a robot submarine, and an RC submarine. When the water contaminant removing apparatus is moved to remove water contaminants, the efficiency of removing water contaminants can be improved.

In addition, the water contaminant removing apparatus according to the embodiment of the present invention may further include a lattice-shaped supporting film 13.

The lattice-shaped supporting film 13 is disposed on the inlet 1a of the intake pipe 1. The lattice-shaped supporting film 13 acts as a support film that supports the absorption cloth 3 to prevent the absorption cloth 3 from being deflected backwards in the intake pipe by the intake force of the pump.

In addition, the water contaminant removing apparatus according to the embodiment of the present invention may further include a buoyancy unit 14.

The buoyancy unit 14 is a part, such as Styrofoam or air pockets, for generating buoyancy, and is coupled to the surrounding portion of the intake pipe 1.

The buoyancy unit 14 provides buoyancy allowing the intake pipe 1 to float on the surface of water, such that the water contaminant removing apparatus can move on the surface of water. In the intake pipe 1 to which buoyancy is applied, the lower space of the inlet 1a is disposed below the surface of water, and the upper space of the inlet 1a is disposed above the surface of water, such that the intake pipe 1 is not completely submerged in water. This makes it possible to very easily remove water contaminants, such as oil, floating on the surface of water.

The first inlet 1c of the inner pipe disposed within the intake pipe 1 is submerged below the surface of water. The second inlet 1a, the diameter of which is greater than that of the first inlet 1c, is disposed in front of the first inlet 1c of the pump to surround the first inlet 1c in a watertight manner. The second inlet 1a is disposed to extend from above to below the surface of water, such that the intake pipe 1 is not completely submerged in water. This makes it possible to very easily remove water contaminants, such as oil, floating on the surface of water.

FIG. 4 is a view illustrating a configuration in which an extension pipe 15 is added to the inlet 1a of the intake pipe 1 and a length adjustable pipe 16 is disposed on the extension pipe 15.

As illustrated in FIG. 4, the water contaminant removing apparatus according to the embodiment of the present invention may further include extension pipe 15, the length adjustable pipe 16, and a length-adjusting unit 17.

The extension pipe 15 is coupled with the inlet 1a of the intake pipe 1 to communicate with the inlet 1a of the intake pipe 1.

The length adjustable pipe 16 is implemented as a bellows or an elastic hose, the length of which is adjustable. The length adjustable pipe 16 is disposed on the inlet 1a, or as illustrated in FIG. 4, is disposed on the extension pipe 15 to communicate with the extension pipe 15.

The length-adjusting unit 17 is a transportable part, such as a hydraulic cylinder, coupled with the side portion of the length adjustable pipe 16. In the case of a hydraulic cylinder, the axial end of a movable rod thereof is engaged with the length adjustable pipe 16, and the other axial end thereof is engaged with the intake pipe 1 or the extension pipe 15. The length-adjusting unit 17 is driven in response to a signal input from an external source to adjust the length of the length adjustable pipe 16.

The length of the length adjustable pipe 16 is adjusted by the length-adjusting unit 17, such that the water contaminant removing apparatus according to the present embodiment can selectively remove water contaminants in water.

In this case, the water contaminant removing apparatus according to the embodiment of the present invention may further include an underwater camera 18 and a monitor 19.

The underwater camera 18 is disposed adjacent to the inlet 1a.

The monitor 19 works in concert with the underwater camera 18 to display images captured by the underwater camera 18 by receiving images therefrom.

The underwater camera 18 and the monitor 19 notify an operator of underwater conditions, such that the operator can examine underwater contaminants on the monitor 19 and then selectively adjust the intake position of an intake port 16a of the length adjustable pipe 16 using the length-adjusting unit 17, thereby easily removing water contaminants.

Here, the water contaminant removing apparatus according to the embodiment of the present invention may further include a lighting unit 20.

The lighting unit 20 is disposed adjacent to the intake port of the length adjustable pipe 16 or the inlet 1a of the intake pipe 1 in order to radiate light in the direction in which the underwater camera 18 captures images.

The lighting unit 20 radiates light in the direction in which the underwater camera 18 captures images, such that the underwater camera 18 can easily capture images in dark underwater areas.

The foregoing descriptions of the specific exemplary embodiments of the present invention including specific features, such as the specific components, have been presented with respect to the drawings. They are only provided for a better understanding of the general idea of the present invention and are not intended to limit the present invention. A person skilled in the art can make a variety of modifications and alterations from the foregoing description.

It should be understood that the principle of the present invention is not limited by the foregoing embodiments but the scope of the present invention shall be defined by the Claims appended hereto and their equivalents.

INDUSTRIAL APPLICABILITY

Recently, oil spill accidents, in which oil spills into seawater, frequently occur due to the collision of oil tankers or the like. Since the present invention removes contaminants using absorption cloth by periodically or continuously arranging a clean portion of the absorption cloth in the inlet, it is possible to remove contaminants more efficiently than manual operations of the related art without influencing on the marine ecosystem. Once an oil spill accident occurs in the sea, a total of damage compensation can reach up to 200 billion Korean Won. An example of an accident record regarding restoration will be described as follows:

The oil spill which occurred on the Yellow Sea coast of Taean County on Dec. 7, 2007, was caused as a crane barge "Samsung 1" owned by Samsung Heavy Industries collided with "Hebei Spirit", a Hong Kong registered crude carrier, resulting in the spilling of crude oil of a total of 12,547 kl from the tank of the crude carrier to the coastline of Taean. This accident occurred while the crane barge "Samsung 1" (unpowered vessel) was being towed by a tug after the construction of the Incheon Bridge, as the cable linking the crane barge to the tug was snapped, and the crane barge collided with the crude carrier anchored at the nearby sea area.

Damage increased as rapid treatment was not carried at the early stage and crude oil breached the oil fence. Although the hole in the damaged crude carrier was closed two days after the accident, about 8,000 hectares including marine farms and fisheries of Taean County were already contaminated by crude oil. Tar lumps formed by the coagulation of crude oil rapidly spread to arrive at South Jeolla province on 30 December of that year and at Chuja Islands, the northern region of Jeju province, on Jan. 3, 2008. According to experts' explanations, tar lumps spread very rapidly like this because of weather conditions, including tidal waves and strong winds, as well as careless construction of the containment line by the authorities in charge.

When the government researched the ecosystem of Taean County, it was determined that the sea life including plants and animals was reduced by about half compared to before the oil spill. It was reported that shellfish will return after about 5 years and recover to the level of normal years after about 10 years. Seaweeds, such as layer or green layer, were reduced by an average of 43%, and Crustacea numbers were drastically reduced. Benzene compounds and heavy metals, such as Cu or Cd, were found in the bodies of Mediterranean mussels and mud shrimps (*Upogebia major*). The concentration of oil components in beach sediments was increased as much as five times or more before the oil spill. However, the ecosystem has recovered significantly due to the endeavor of people inside and outside of Taean County.

[Mayer Knowledge Encyclopedia] Oil Spill—"Black Gold" that swallowed the Taean Sea (Great sea travel; Dec. 1, 2009, Greenway)]

The areas affected by the oil spill require a long period of 10 years or more for restoration, due to the enormous amount of damage. Since oil spreads rapidly, an apparatus or method able to rapidly remove oil is required. When the apparatus of the described invention is used in removing oil, it is estimated that oil can be completely removed within two or three days depending on the number of apparatuses dispatched.

The invention claimed is:

1. A water contaminant removing apparatus for removing water contaminants, the apparatus comprising:
   an upper housing positioned above a surface of water;
   a first roller disposed in the upper housing;
   a lower housing positioned below the surface of water;
   a second roller disposed in the lower housing;
   an intake pipe disposed between the upper and lower housings;
   fixing holes formed on upper and lower surfaces of the intake pipe; and
   an absorption cloth inserted into the fixing holes and including one end wound on the first roller and the other end wound on the second roller, the absorption cloth configured to move upward and downward through the fixing holes when the first and second rollers operate.

2. The water contaminant removing apparatus according to claim 1, further comprising:
   an intake pump to which the intake pipe is connected.

3. The water contaminant removing apparatus according to claim 1, wherein the intake pipe includes a first inlet submerged in water and a second inlet surrounding the first inlet and wherein
   a diameter of the second inlet is greater than a diameter of the first inlet.

4. The water contaminant removing apparatus according to claim 1, wherein a buoyancy unit is disposed inside or outside of the intake pipe.

5. The water contaminant removing apparatus according to claim 3, wherein the fixing holes are formed on upper and lower surfaces of the second inlet.

6. The water contaminant removing apparatus according to claim 1, further comprising a supporting film disposed in an inlet of the intake pipe, the supporting film preventing the absorption cloth from being pushed backwards.

7. The water contaminant removing apparatus according to claim 1, further comprising:
   a first coupling member coupling the upper housing with the intake pipe; and
   a second coupling member coupling the lower housing with the intake pipe.

8. The water contaminant removing apparatus according to claim 3, further comprising:
   a length adjustable pipe coupled to the second inlet to adjust a length of the intake pipe; and
   a length-adjusting unit coupled to a side portion of the length adjustable pipe to adjust the length of the length adjustable pipe.

9. The water contaminant removing apparatus according to claim 1, the water contaminant removing apparatus being coupled with one selected from the group consisting of a ship, a submarine, a robot ship, an RC ship, a robot submarine, and an RC submarine.

10. The water contaminant removing apparatus according to claim 8, further comprising:
    an underwater camera disposed adjacent to an inlet of the length adjustable pipe; and
    a monitor displaying images captured by the underwater camera.

11. The water contaminant removing apparatus according to claim 10, further comprising a lighting unit disposed adjacent to the underwater camera to radiate light in a direction in which the underwater camera captures images.

\* \* \* \* \*